US012111547B1

(12) United States Patent
Huang et al.

(10) Patent No.: US 12,111,547 B1
(45) Date of Patent: Oct. 8, 2024

(54) DISPLAY PANEL REPAIR METHOD, DISPLAY PANEL AND DISPLAY

(71) Applicant: HKC CORPORATION LIMITED, Shenzhen (CN)

(72) Inventors: Gu Huang, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/509,515

(22) Filed: Nov. 15, 2023

(30) Foreign Application Priority Data

May 10, 2023 (CN) .......................... 202310519533.X

(51) Int. Cl.
  *G09G 3/36* (2006.01)
  *G02F 1/1362* (2006.01)
  *G09G 3/00* (2006.01)

(52) U.S. Cl.
  CPC ....... *G02F 1/136263* (2021.01); *G09G 3/006* (2013.01); *G09G 3/3688* (2013.01); *G09G 2330/08* (2013.01)

(58) Field of Classification Search
  CPC .. G09G 3/006; G09G 3/3688; G09G 2330/08; G02F 1/136259; G02F 1/136263
  See application file for complete search history.

(56) References Cited

U.S. PATENT DOCUMENTS

| 7,995,184 | B2 * | 8/2011 | Kim | G02F 1/1345 |
| | | | | 349/192 |
| 8,537,329 | B2 * | 9/2013 | Chen | G02F 1/136259 |
| | | | | 349/55 |
| 9,405,162 | B2 * | 8/2016 | Ogasawara | G02F 1/136259 |
| 9,514,693 | B2 * | 12/2016 | Yoshida | G09G 3/36 |
| 2005/0195338 | A1 * | 9/2005 | Matsumoto | G02F 1/136204 |
| | | | | 349/40 |

(Continued)

FOREIGN PATENT DOCUMENTS

| CN | 102073159 | 5/2011 |
| CN | 102854648 | 1/2013 |

(Continued)

OTHER PUBLICATIONS

CNIPA, First Office Action for CN Application No. 202310519533.X, Jun. 17, 2023.

(Continued)

*Primary Examiner* — Joe H Cheng
(74) *Attorney, Agent, or Firm* — Hodgson Russ LLP

(57) ABSTRACT

A display panel includes a substrate, a plurality of data lines, at least one repair line, at least one compensation line and a data driver. The repair line is arranged on the substrate and overlapped with at least part of the plurality of data lines, for connecting with a broken data line when the broken data line with a breakpoint exists in the plurality of data lines, to repair the broken data line. Each compensation line is connected to the repair line through a resistor. The data driver includes a plurality of first output channels connected to the plurality of data lines, at least one second output channel connected to an end of the repair line away from the resistor and at least one third output channel connected to an end of the compensation line away from the resistor.

18 Claims, 4 Drawing Sheets

(56) References Cited

U.S. PATENT DOCUMENTS

| | | | |
|---|---|---|---|
| 2006/0125754 A1* | 6/2006 | Rao | G09G 3/3648 345/93 |
| 2010/0013754 A1 | 1/2010 | Peng et al. | |
| 2010/0060559 A1* | 3/2010 | Nakagawa | G02F 1/136259 257/E21.591 |
| 2010/0188594 A1* | 7/2010 | Qian | G02F 1/1345 349/54 |

FOREIGN PATENT DOCUMENTS

| | | |
|---|---|---|
| CN | 106502605 | 3/2017 |
| CN | 109387988 | 2/2019 |
| CN | 112242123 | 1/2021 |
| JP | 2005234492 A * | 9/2005 |

OTHER PUBLICATIONS

CNIPA, Notification to Grant Patent Right for Invention for CN Application No. 202310519533.X, Jul. 1, 2023.

* cited by examiner

DISPLAY PANEL REPAIR METHOD, DISPLAY PANEL AND DISPLAY

CROSS-REFERENCE TO RELATED APPLICATIONS

This application claims priority to Chinese Patent Application 202310519533.X, filed May 10, 2023, the entire disclosure of which is incorporated herein by reference.

TECHNICAL FIELD

The present application relates to the field of display technology, and more particularly, to a display panel repair method, a display panel and a display.

BACKGROUND

In the production process of display panel, there may be some defective products with breakpoints in data lines due to process reasons. These defective products can only be scrapped since obvious vertical dark lines are shown after lighting, which causes cost waste to a certain extent.

In order to improve such defective products, in the related art, a repair line is arranged on a display panel to be connected with a data driver substitute for a section of a broken data line with a breakpoint that is disconnected from a data driver to the repair line, so that the section of the broken data line that is disconnected from the data driver is connected to the data driver by the repair line to provide a data signal to the section of the broken data line that is disconnected from the data driver, so that the section of the broken data line that is disconnected from the data driver can be lit. However, the capacitance and resistor are greater than those of other normal data lines after the section of the broken data line that is disconnected from the data driver is superimposed with the repair line, resulting in a lower charging rate of corresponding sub-pixels than that of other sub-pixels, resulting in a lower brightness of the corresponding section of the broken data line that is disconnected from the data driver than that of other peripheral areas, and the screen display effect of the repaired display panel is poor.

SUMMARY

There are provided a display panel repair method, a display panel and a display according to embodiments of the present application. The technical solution is as below:

According to a first aspect of the embodiments of the present application, a display panel is disclosed, which includes a substrate, a plurality of data lines, at least one repair line, at least one compensation line and a data driver; wherein the a plurality of data lines are arranged on the substrate and extend in a column direction, for transmitting data signals; the at least one repair line is arranged on the substrate and overlapped with at least part of the plurality of data lines, for connecting with a broken data line when the broken data line with breakpoint exists in the plurality of data lines, to repair the broken data line; the at least one compensation line is arranged on the substrate, and each compensation line is connected to the repair line through a resistor; and the data driver includes a plurality of first output channels, at least one second output channel and at least one third output channel, each of the first output channel is connected to the data line, each second output channel is connected to an end of the repair line away from the resistor, and each third output channel is connected to an end of the compensation line away from the resistor, the data driver is configured to input data signals to the data lines, the repair line and the compensation line.

According to a second aspect of the embodiments of the present application, a display panel repair method is disclosed for repairing a broken data line of the display panel as described above, one or more of a plurality of data lines being the broken data line, the broken data line being divided by a breakpoint into a first sub-data line connected to a data driver and a second sub-data line disconnected from the data driver, the display panel repair method includes:

connecting the second sub-data line to a repair line;

configuring a magnitude of a data signal output by the data driver to the compensation line connected to the repair line to be less than a magnitude of a current row data signal, when a magnitude of a previous row data signal input to the repair line by the data driver is greater than a magnitude of the current row data signal; and configuring the magnitude of the data signal output by the data driver to the compensation line connected to the repair line to be greater than the magnitude of the current row data signal, when the magnitude of the previous row data signal input to the repair line by the data driver is less than the magnitude of the current row data signal.

According to a third aspect of the embodiments of the present application, a display includes the display panel above and a backlight module arranged opposite to the display panel and configured to provide backlight for the display panel.

It should be understood that the above general description and the following detailed description are exemplary only and are not intended to limit the present application.

BRIEF DESCRIPTION OF THE DRAWINGS

The accompanying drawings, which are incorporated in and constitute a part of the description, illustrate embodiments consistent with the present application and together with the description serve to explain the principles of the present application.

DESCRIPTION OF THE EMBODIMENTS

The exemplary embodiments will now be described more fully with reference to the accompanying drawings. However, the example embodiments can be implemented in a variety of forms and should not be construed as being limited to the examples set forth herein. Rather, these embodiments are provided so that the present application will be more comprehensive and complete, and the concept of example embodiments will be fully communicated to those skilled in the art.

In the description of the present application, "a plurality of" means imply that two or more unless otherwise stated.

In addition, the terms of "first", "second", "third" are for descriptive purposes only and cannot be construed as indicating or implying relative importance or implying the number of the indicated technical features. Thus, the features defined as "first", "second", and "third" may be explicitly or implicitly defined as including one or more of the features.

In the related art, a repair line is arranged on a display panel, and when a broken data line has a breakpoint on the display panel, a section of the broken data line that is disconnected from the data driver is connected to the data driver by using the repair line, so as to provide a data signal to a section of the broken data line disconnected from the data driver (hereinafter referred to as a second sub-data line). Since a plurality of signal lines, such as a plurality of scan lines and a plurality of data lines, are arranged on the display panel, the repair line forms a coupling capacitance with the signal lines on the display panel, resulting in a capacitance of the second sub-data line being greater than that of the normal data line without a breakpoint. Moreover, the superposition length of the repair line and the second sub-data line is greater than the length of the normal data line, resulting in the resistance of the second sub-data line connected to the repair line being greater than that of the normal data line.

Since the resistance and capacitance of the repaired second sub-data line are greater than those of the normal data line, there will be a larger RC delay when the input voltage changes, so that the charging rate of the sub-pixel corresponding to the second sub-data line is lower than that of the sub-pixel corresponding to the normal data line under a specific charging time, resulting in the brightness of the area corresponding to the second sub-data line being lower than that of other peripheral areas, and the screen display effect of the repaired display panel is poor. Therefore, the present application provides a novel display panel, a display including the display panel and a display panel repair method applicable for the display panel, so as to improve the screen display effect of the display panel/display.

The charging rate of the sub-pixel refers to the ratio of the peak value of the pixel voltage to the voltage of the data signal after the sub-pixel is charged.

Figure 1:
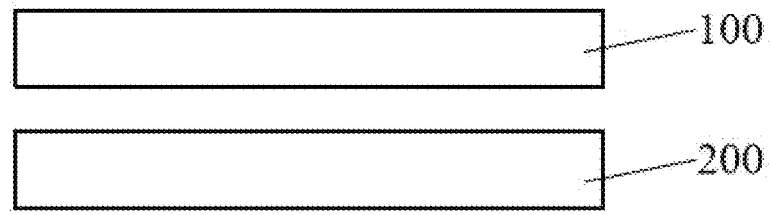
FIG. 1 schematically shows a schematic diagram of a composition of a display provided by an embodiment of the present application.
Figure 2:
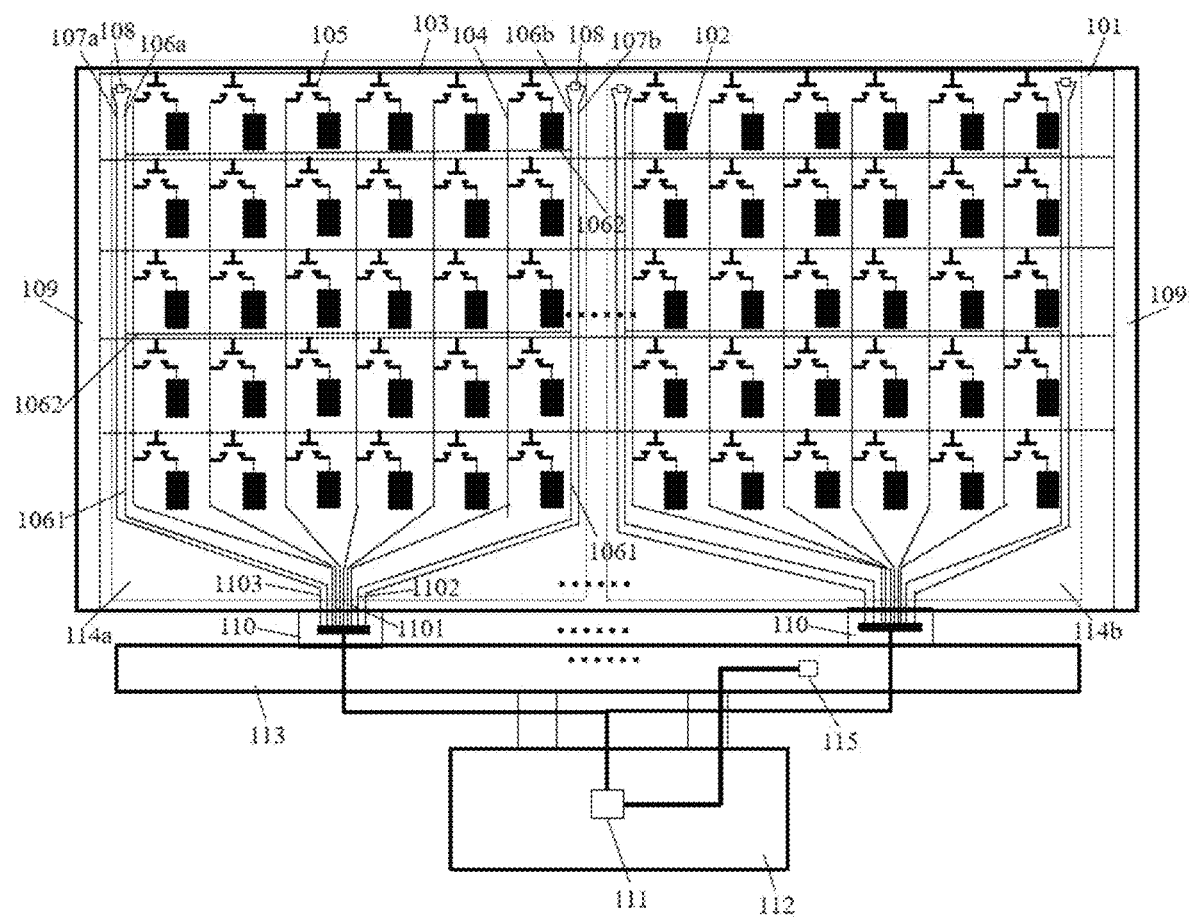
FIG. 2 schematically shows a partial schematic diagram of a display panel provided by an embodiment of the present application.

FIG. 1 schematically shows a schematic diagram of a composition of a display provided by an embodiment of the present application. FIG. 2 schematically shows a partial schematic diagram of a display panel provided by an embodiment of the present application.

As shown in FIG. 1, the display includes a display panel 100 and a backlight module 200, and the backlight module 200 is disposed opposite to the display panel 100.

The backlight module 200 is configured to provide backlight for the display panel 100.

As shown in FIG. 2, the display panel 100 includes a substrate 101, a plurality of pixel electrodes 102, a plurality of scan lines 103, a plurality of data lines 104, common electrodes (not shown), a plurality of switching transistors 105, a plurality of repair lines 106a/106b, a plurality of compensation lines 107a/107b, a resistor 108, a gate driver 109, a data driver 110, a timing controller 111, and the like.

The substrate 101 may be, for example, a printed circuit board with a multilayer structure or the like.

A plurality of pixel electrodes 102 are provided on the substrate 101, and a plurality of pixel electrodes 102 are arranged in a matrix manner in a plurality of rows and columns on the substrate 101.

The scan line 103 is provided on the substrate 101 and extends in a row direction, and the scan line 103 is configured to transmit a gate driving signal.

The data line 104 is provided on the substrate 101 and extends in a column direction, and the data line 104 is configured to transmit a data signal, i.e., a pixel driving signal. The data line 104 and the scan line 103 are overlapped and are respectively provided on different layers of the substrate 101.

One pixel electrode 102 and one switching transistor 105 are arranged in a region partitioned by every two adjacent scan lines 103 and every two adjacent data lines 104, and a region partitioned by every two adjacent scan lines 103 and every two adjacent data lines 104 is a region corresponding to one sub-pixel.

The switching transistor 105 is a thin film transistor, a gate of the switching transistor 105 is connected to the scan line 103, a source of the switching transistor 105 is connected to the data line 104, and a drain of the switching transistor 105 is connected to the corresponding pixel electrode 102. If a sufficient positive voltage is applied to the scan line 103, the switching transistor 105 connected with the scan line 103 will be turned on, and the pixel electrode 102 connected with the scan line 103 will be connected to the data line 104, and the data signal from the data line 104 will be transmitted to the corresponding pixel electrode 102, so that the corresponding sub-pixel is illuminated.

The common electrode is configured to output a common voltage Vcom. The liquid crystal molecules between the pixel electrode 102 and the common electrode rotate according to a voltage difference between the common voltage Vcom of the common electrode and the data signal received by the pixel electrode 102, so as to control the transmittance of the liquid crystal molecules and thereby achieve the effect of controlling the display brightness.

The repair line 106a/106b is provided on the substrate 101 and overlapped with at least part of the data lines 104, and when a broken data line having a breakpoint exists among the plurality of data lines 104, the repair line 106a/106b is configured to connect the broken data line, to repair the broken data line.

It should be noted that the repair line 106a/106b is overlapped with the data line 104, which means that the repair line 106a/106b and the data line 104 intersect and are stacked, and the repair line 106a/106b is insulated from the broken data line before the repair line 106a/106b is used to repair the broken data line. The repair line 106a/106b is overlapped with at least part of the data lines 104, either each repair line 106a/106b is overlapped with all of the data lines 104 on the substrate 101 or each repair line 106a/106b is overlapped with only part of the data lines 104 on the substrate 101.

The compensation line 107a/107b is provided on the substrate 101, and each compensation line 107a/107b is connected to the repair line 106a/106b through the resistor 108. As shown in FIG. 2, each compensation line 107a is connected to a repair line 106a through a resistor 108, and each compensation line 107b is connected to a repair line 106b through a resistor 108.

The resistance value of the resistor 108 is in the range of a few hundred ohms to a few thousand ohms, thereby preventing the data signal on the repair line 106a/106b from being biased due to the excessive leakage current caused by the too small resistance value, and the leakage effect can be avoided due to the too large resistance value.

The gate driver 109 is connected to a plurality of scan lines 103, and the timing controller 111 outputs a logic level signal to the gate driver 109. The gate driver 109 receives the logic level signal (digital quantity) output from the timing controller 111 and converts the logic level signal (analog quantity) into a gate driving signal (analog quantity) to selectively apply a positive voltage to a certain scan line 103, thereby turning on the switching transistor 105 on the scan line 103.

The data driver 110 includes a plurality of first output channels 1101, a second output channel 1102, and a third output channel 1103, each of the plurality of first output channels 1101 is connected to the data line 104, each second output channel 1102 is connected to an end of the repair line 106a/106b away from the resistor 108, and each third output channel 1103 is connected to an end of the compensation line 107a/107b away from the resistor 108.

The data driver 110 receives a data signal of a digital quantity (gray scale data) output from the timing controller 111 and converts the data signal into an analog data signal. The data driver 110 inputs a data signal to the data line 104 through the first output channel 1101 to apply the data signal to the corresponding pixel electrode 102 through the switching transistor 105 which is currently turned on, thereby controlling the rotation of the liquid crystal molecules and achieving the adjustment of the display brightness. The data driver 110 inputs the data signal to the repair line 106a/106b through the second output channel 1102 to transmit the data signal to the section of the broken data line that is disconnected from the data driver 110 through the repair line 106a/106b. It can be understood that the broken data line is divided by the breakpoint into a section connected to the data driver 110 and a section disconnected from the data driver, and the data signal input from the first output channel 1101 cannot be transmitted to the section of the broken data line that is disconnected from the data driver. Therefore, the corresponding data signal is input to the repair line 106a/106b through the second output channel 1102 and transmitted to the section of the broken data line that is disconnected from the data driver through the repair line 106a/106b. The data driver 110 inputs the data signal to the compensation line 107a/107b through the third output channel 1103.

It can be understood that the first output channel 1101, the second output channel 1102, and the third output channel 1103 are respectively any one of a plurality of output channels of the data driver 110, and magnitudes of the data signals transmitted by the first output channel 1101, the second output channel 1102, and the third output channel 1103 may be the same or different.

The gate driver 109, the data driver 110 and the timing controller 111 constitute a driving module, to provide corresponding control signals to the display panel, thereby controlling the display panel to display corresponding images.

In the embodiment shown in FIG. 2, the timing controller 111 is provided on the first circuit board 112, and the data driver 110 is provided on the second circuit board 113 independent of the first circuit board 112.

In the embodiment shown in FIG. 2, a plurality of repair lines 106a/106b and a plurality of compensation lines 107a/107b are provided on the substrate 101, and the data driver 110 having a plurality of second output channels 1102 and a plurality of third output channels 1103 is only an example of the present application. In other embodiments, one repair line and one compensation line may be provided on the substrate 101, and accordingly, the data driver 110 has one second output channel 1102 and one third output channel 1103.

FIG. 2 shows only a partial composition of the display panel 100, and it can be understood that the display panel 100 may also include other necessary components such as a liquid crystal disposed between the pixel electrode 102 and a common electrode, a color filter and a glass plate disposed on the front side of the substrate 101 and the like.

It will be appreciated that the display may also include other components besides the display panel 100 and the backlight module 200.

In the present application, the repair line 106a/106b and the compensation line 107a/107b are provided on the substrate 101, the repair line 106a/106b is provided on the substrate 101 and overlapped with at least part of the data lines 104, each compensation line 107a/107b is connected to the repair line 106a/106b through the resistor 108, and the repair line 106a/106b and the compensation line 107a/107b are respectively connected to different output channels of the data driver 110, and data signals are input to the repair line 106a/106b and the compensation line 107a/107b through the data driver 110. When there is a broken data line with a breakpoint in the plurality of data lines 104, a section of the broken data line 104 that is disconnected from the data driver 110 can be connected to the repair line 106a/106b, and the data signal can be transmitted to the section disconnected from the data driver 110 through the repair line 106a/106b. When a magnitude of the data signal input to the compensation line 107a/107b by the data driver 110 is less than the data signal input to the repair line 106a/106b by the data driver 110, the repair line 106a/106b leaks electricity to the compensation line 107a/107b through a resistor 108 to accelerate the voltage drop speed of the repair line 106a/106b. When a magnitude of the data signal input to the compensation line 107a/107b by the data driver 110 is greater than a magnitude of the data signal input to the repair line 106a/106b by the data driver 110, the compensation line 107a/107b leaks electricity to the repair line 106a/106b through the resistor 108 to accelerate the voltage rise speed of the repair line 106a/106b, so that the voltage of the broken section can quickly reach a target value, and the screen display effect can be improved.

Hereinafter, the display panel of the present application will be described in further detail.

Referring again to FIG. 2, in an embodiment of the present application, the repair line 106a/106b includes a first sub-repair line 1061 extending in a column direction and a second sub-repair line 1062 extending in a row direction, an end of the first sub-repair line 1061 is connected to the second output channel 1102, and the second sub-repair line 1062 is connected to the first sub-repair line 1061 and overlapped with at least part of the data line 104, and the compensation line 107a/107b is connected to an end of the first sub-repair line 1061 away from the second output channel 1102 through the resistor 108.

The repair line 106a/106b is provided to include the first sub-repair line 1061 extending in the column direction and a second sub-repair line 1062 extending in the row direction. The repair line 106a/106b has a simple structure, is easy to fabricate, and has fewer bent sections, so that the repair line is shorter, and the capacitance and resistance of the section of the broken data line that is disconnected from the data driver 110 can be reduced, and the charging rate of the sub-pixel corresponding to the section of the broken data line that is disconnected from the data driver 110 can be improved.

In an embodiment of the present application, as shown in FIG. 2, two repair lines 106a/106b constitute a repair line group, the second sub-repair line 1062 of the first repair line 106a in the repair line group is connected to the first sub-repair line 1061 of the second repair line 106b in the repair line group, and the second sub-repair line 1062 of the second repair line 106b in the repair line group is connected to the first sub-repair line 1061 of the first repair line 106a in the repair line group.

That is, two repair lines 106a/106b in the repair line group are connected in parallel, and when the second sub-repair line 1062 of any one of the two repair lines 106a/106b is connected to the section of the broken data line that is disconnected from the data driver 110, a data signal (voltage signal) can be simultaneously supplied to the section of the broken data line that is disconnected from the data driver 110 through the two repair lines 106a/106b, and the charging speed can be accelerated, thereby reducing the adverse effect of capacitance and resistance on the charging rate of the sub-pixel corresponding to the section of the broken data line that is disconnected from the data driver 110.

Figure 3:
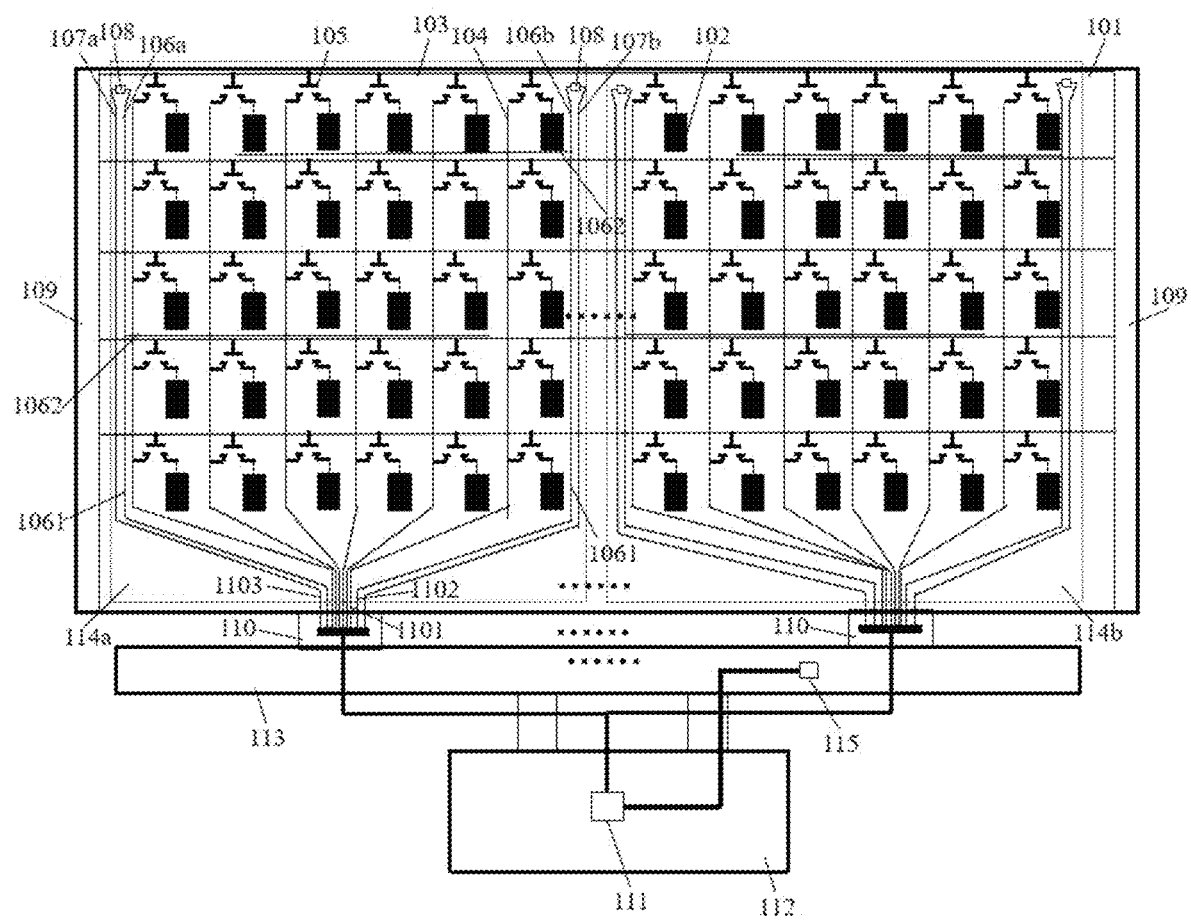
FIG. 3 schematically shows a partial schematic diagram of a display panel provided by another embodiment of the present application.

Of course, in some embodiments, the second sub-repair line 1062 of the first repair line 106a in the repair line group may be spaced from the first sub-repair line 1061 of the second repair line 106b in the repair line group, that is, the second sub-repair line 1062 of the first repair line 106a is not connected to the first sub-repair line 1061 of the second repair line 106b in the repair line group. Similarly, the second sub-repair line 1062 of the second repair line 106b in the repair line group may be spaced from the first sub-repair line 1061 of the first repair line 106a in the repair line group, that is, the second sub-repair line 1062 of the second repair line 106b is not connected to the first sub-repair line 1061 of the first repair line 106a in the repair line group, as shown in FIG. 3. Unlike the embodiment shown in FIG. 2, two repair lines 106a/106b in the same repair line group in the embodiment shown in FIG. 3 may each be used to repair one broken data line, whereas the two repair lines 106a/106b in the same repair line group in the embodiment shown in FIG. 2 may only be used to repair one broken data line.

In an embodiment of the present application, as shown in FIG. 2, the second sub-repair line 1062 of the first repair line 106a in the repair line group is disposed at an intermediate position of the first sub-repair line 1061 of the first repair line 106a, and the second sub-repair line 1062 of the second repair line 106b in the repair line group is disposed at a side of the second sub-repair line 1062 of the second repair line 106b away from the second output channel 1102. In this way, when repairing the broken data line, the second sub-repair line 1062 which is closer to the breakpoint and the section of the broken data line that is disconnected from the data driver 110 can be selectively connected according to the breakpoint position of the broken data line, thereby reducing the length of the section of the broken data line that is disconnected from the data driver 110 superimposed on the repair line 106a/106b, further reducing resistance and capacitance.

In an embodiment of the present application, the compensation line 107a/107b extends in the column direction consistent with the extension direction of the first sub-repair line 1061 of the repair line 106a/106b, and the compensation line 107a/107b is disposed substantially parallel to the first sub-repair line 1061. The resistor 108 is provided in the row direction and both ends of the resistor 108 in the row direction are connected to the first sub-repair line 1061 and the compensation line 107a/107b, respectively.

In an embodiment of the present application, as shown in FIG. 2, the display panel 100 is provided with a plurality of display areas, and the plurality of display areas are spaced apart. The display panel 100 includes a plurality of data drivers 110, each of the plurality of data drivers 110 corresponds to one display area. Each display area is provided with a repair line group, and two first sub-repair lines 1061 in the repair line group are respectively provided on two opposite sides of the display area. Likewise, two compensation lines 107a/107b are is provided for each display area, one of the two compensation line 107a is provided on the side of the first sub-repair line 1061 of the repair line 106a away from the display area, and the other one of the two compensation line 107b is provided on the side of the first sub-repair line 1061 of the repair line 106b away from the display area.

One repair line group and two compensation lines 107a/107b are provided for each display area. When a broken data line exists in the display area, the repair line group corresponding to the display area can be used to repair the broken data line. The two first sub-repair lines 1061 in the repair line group and the two compensation lines 107a/107b are respectively provided on two opposite sides of the display area, which directly utilizes the blank areas between the display areas without the need of increasing the size of the substrate 101 due to the arrangement of the repair line 106a/106b and the compensation line 107a/107b.

In the embodiment shown in FIG. 2, only one repair line group (i.e., two repair lines 106a/106b) and two compensation lines 107a/107b are provided for each display area. Of course, in other embodiments, three repair lines and three compensation lines, four repair lines and four compensation lines may be provided as the case may be.

It should be noted that the display panel 100 of the present application may have broken data lines or may not have broken data lines.

Figure 4:
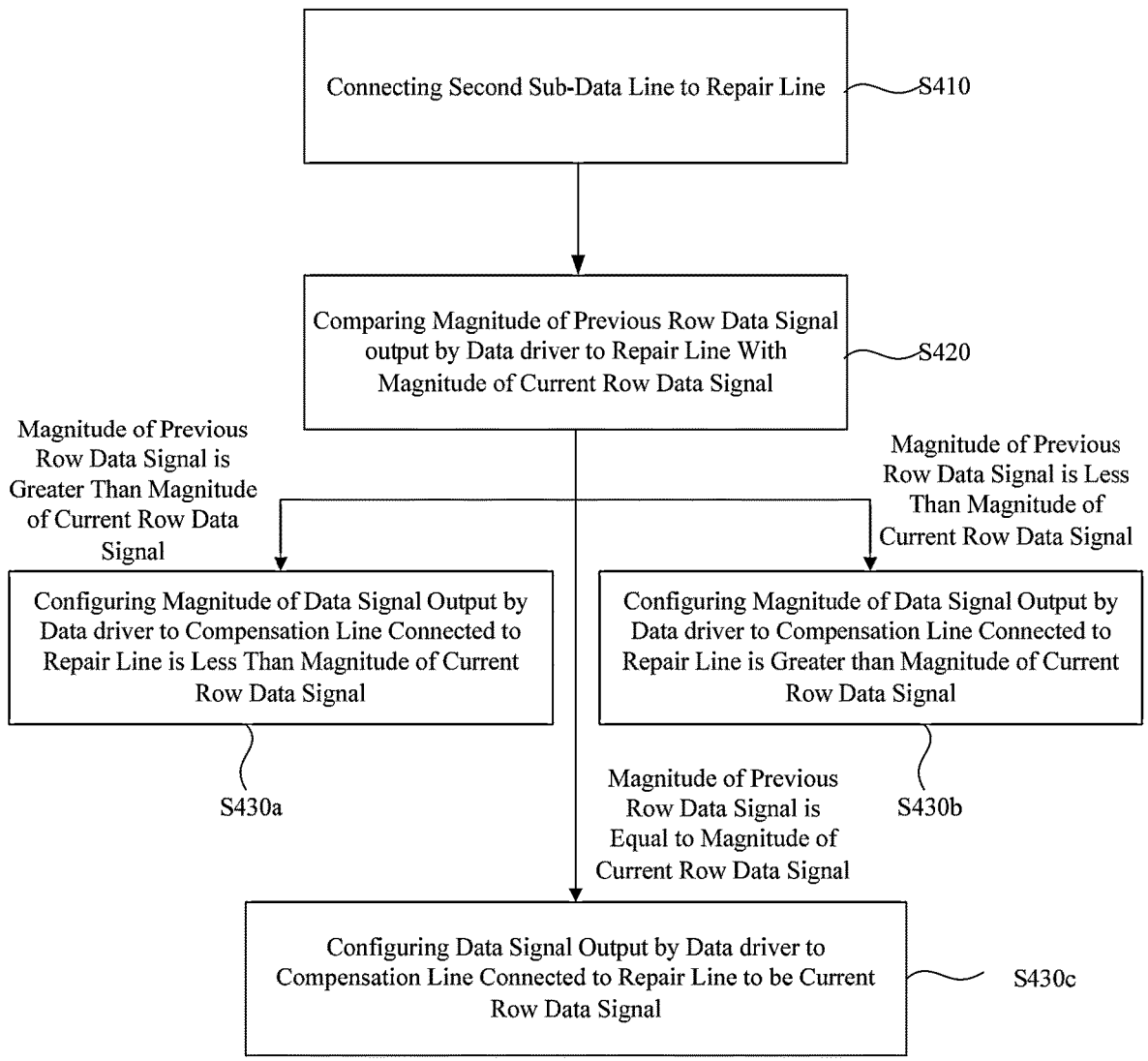
FIG. 4 schematically shows a flowchart of a display panel repair method provided by an embodiment of the present application.
Figure 5:
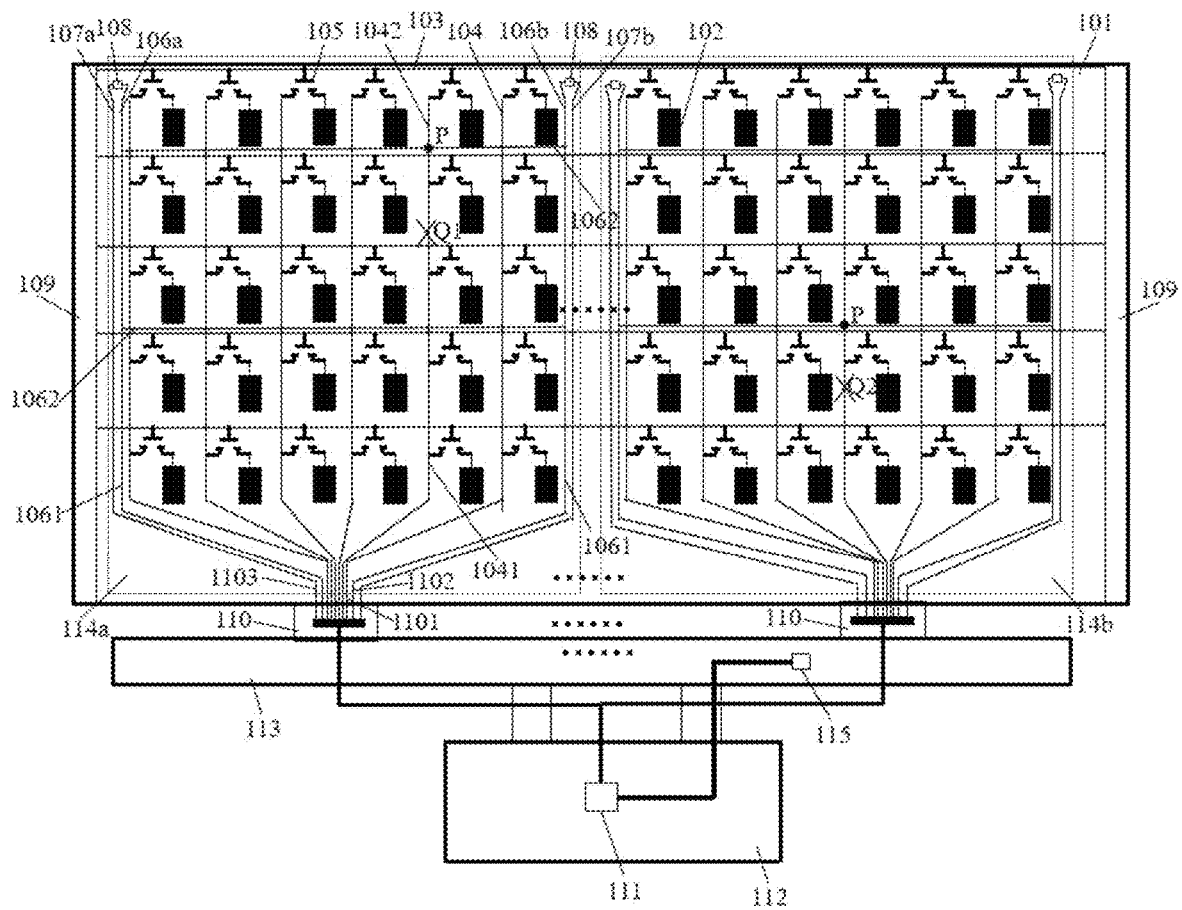
FIG. 5 schematically shows a partial schematic diagram of a display panel provided by an embodiment of the present application after repairing a broken line.

FIG. 4 schematically shows a flowchart of a display panel repair method provided by an embodiment of the present application, the display panel repair method can be applied to the display panel provided by any embodiment of the present application, for example, if a broken data line exists in the display panel shown in FIG. 2, the display panel repair method can be applied to repair the broken data line of the display panel shown in FIG. 2. The broken data line is divided by a breakpoint into a first sub-data line 1041 connected to the data driver 110 and a second sub-data line 1042 disconnected from the data driver 110 (as shown in FIG. 5).

As shown in FIG. 4, the display panel repair method provided by the embodiment of the present application includes step S410 to step S430, as follows.

In step S410, the second sub-data line is connected to a repair line.

By connecting the second sub-data line 1042 with the repair line 106a/106b, the second sub-data line 1042 is connected to the data driver 110 through the repair line 106a/106b, so that the pixel electrodes 102 connected with the second sub-data line 1042 through the switching transistors 105 can receive the data signal output by the data driver 110, so that the sub-pixels corresponding to the second sub-data line 1042 can be lit up, and the display panel is prevented from showing obvious vertical dark lines after lighting.

In an embodiment of the present application, the repair line 106a/106b includes a first sub-repair line 1061 extending in a column direction and a second sub-repair line 1062 extending in a row direction, an end of the first sub-repair line 1061 is connected to the second output channel 1102, and the second sub-repair line 1062 is connected to the first sub-repair line 1061 and overlapped with the second data line 1042, and the compensation line 107a/107b is connected to an end of the first sub-repair line 1061 away from the second output channel 1102 through the resistor 108. In step S410, the second sub-data line is connected to the repair line, that is, the second sub-data line is connected to the nearest second sub-repair line.

A plurality of display areas are provided on the display panel, in case of the embodiment shown in FIG. 2, a first display area 114a and a second display area 114b are provided on the display panel, two opposite sides of the first display area 114a are provided with repair lines 106a and 106b, respectively, and two opposite sides of the second display area 114b are also provided with repair lines 106a and 106b, respectively, that is, two repair lines are provided for each display area. In the first display area 114a, the broken data line has a breakpoint at a position Q1, and the second sub-data line 1042 is closer to the upper second sub-repair line 1062. In step S410, the second sub-data line is connected to the nearest second sub-repair line, that is, the second sub-data line 1042 is connected to the upper second sub-repair line. In the second display area 114b, the broken data line has a breakpoint at a position Q2, and the second sub-data line 1042 is closer to the lower second sub-repair line. In step S410, the second sub-data line is connected to the nearest second sub-repair line, that is, the second sub-data line 1042 is connected to the lower second sub-repair line. A partial schematic diagram of the display panel with the broken data line being repaired is shown in FIG. 5.

In an embodiment of the present application, in step S410, the second sub-data line and the repair line are connected by lasering at the overlapping position P of the second sub-data line and the repair line. Specifically, the second sub-data line is connected to the nearest second sub-repair line by lasering at the overlapping position P of the second sub-data line and the nearest second sub-repair line. The second sub-data line is connected to the repair line by means of a laser, which has high efficiency and high accuracy.

In an example, the repair line 106a/106b is disposed on the data line 104, and the melting point of the repair line 106a/106b is lower than that of the data line 104. In step S410, the laser is focused at the overlapping position of the repair line and the second sub-data line, so that the repair line and the second sub-data line at the overlapping position enters a melting state, thereby connecting the second sub-data line and the repair line.

In an example, the repair line 106a/106b is disposed on the data line 104, and a transparent conductive layer is disposed at the overlapping position of the repair line 106a/106b and the data line 104, and the melting point of the transparent conductive layer is lower than that of the repair line 106a/106b and the data line 104. In step S410, the laser is focused on the transparent conductive layer, so that the transparent conductive layer enters a melting state at a position corresponding to the overlapping position of the repair line and the second sub-data line, thereby connecting the second sub-data line and the repair line.

In step S420, a magnitude of the previous row data signal input to the repair line by the data driver is compared with a magnitude of the current row data signal, when the magnitude of the previous row data signal input to the repair line by the data driver is greater than the magnitude of the current row data signal, the procedure proceeds to step S430a; when the magnitude of the previous row data signal input to the repair line by the data driver is less than the magnitude of the current row data signal, the procedure proceeds to step S430b; and when the magnitude of the previous row data signal input to the repair line by the data driver is equal to the magnitude of the current row data signal, the procedure proceeds to step S430c.

It should be understood that the previous row data signal is a data signal corresponding to the previous row pixel electrodes, and the current row data signal is a data signal corresponding to the current row pixel electrodes.

When the magnitude of the previous row data signal output by the data driver to the repair line is greater than the magnitude of the current row data signal, it is indicated that it is necessary to reduce the voltage on the basis of the voltage signal input to the previous row pixel electrode and then input it to the current row pixel electrode. When the magnitude of the previous row data signal input to the repair line by the data driver is less than the magnitude of the current row data signal, it is indicated that it is necessary to increase the voltage on the basis of the voltage signal input to the previous row pixel electrode, and then input it to the current row pixel electrode. However, since the resistance and capacitance of the repaired second sub-data line are greater than those of the normal data line, there will be a large RC delay when the input voltage changes. Therefore, the effect of the RC delay is reduced by the following steps S430a and S430b.

In step S430a, the magnitude of the data signal output by the data driver to the compensation line connected with the repair line is configured to be less than the magnitude of the current row data signal.

That is, the voltage output by the data driver to the compensation line connected to the repair line is less than the current row voltage. Since the voltage of the compensation line connected to the repair line is less than the voltage of the repair line, the repair line leaks electricity to the compensation line through the resistance, so that the voltage drop speed of the repair line can be accelerated, the voltage of the second sub-data line can quickly reach the target value, and the voltage peak value of the sub-pixel corresponding to the second sub-data line can reach the target value, thus improving the charging rate of the sub-pixel corresponding to the second sub-data line and improving the screen display effect of the repaired display panel.

In an embodiment of the present application, in step S430a, the data signal output by the data driver to the compensation line connected to the repair line is the voltage data corresponding to the lowest gray scale that can be displayed by the display panel, for example, the voltage data corresponding to the 0 gray scale. Therefore, the gap between the voltage of the compensation line connected to the repair line and the voltage of the repair line is large, and the leakage speed of the repair line to the compensation line is accelerated, thereby speeding up the voltage drop speed of the repair line.

In step S430b, the magnitude of the data signal output by the data driver to the compensation line connected to the repair line is configured to be greater than that of the current row data signal.

That is, the voltage output by the data driver to the compensation line connected to the repair line is greater than the current row voltage. Since the voltage of the compensation line connected to the repair line is greater than the voltage of the repair line, the compensation line leaks electricity to the repair line through the resistance, so that the voltage rise speed of the repair line can be accelerated, the voltage of the second sub-data line can quickly reach the target value, and the voltage peak value of the sub-pixel corresponding to the second sub-data line can reach the target value, thus improving the charging rate of the sub-pixel corresponding to the second sub-data line and improving the screen display effect of the repaired display panel.

In an embodiment of the present application, in step S430b, the data signal output by the data driver to the compensation line connected to the repair line is the voltage data corresponding to the highest gray scale that can be displayed by the display panel, for example, the voltage data corresponding to the 255 gray scale. Therefore, the gap between the voltage of the compensation line connected to the repair line and the voltage of the repair line is large, and the leakage speed of the compensation line to the repair line is accelerated, thereby speeding up the voltage rise speed of the repair line.

In step S430c, the data signal output by the data driver to the compensation line connected to the repair line is configured to be the current row data signal.

When the magnitude of the previous row data signal input to the repair line by the data driver is equal to the magnitude of the current row data signal, it is indicated that there is no need to increase or decrease the voltage on the basis of the voltage signal input to the previous row pixel electrode. In this case, there is no need to cause the compensation line to leak electricity to the repair line or cause the repair line to leak electricity to the compensation line. Therefore, the data signal input to the compensation line connected to the repair line by the data driver is set to be the current row data signal.

When the display panel repair method of the present application is applied to the display panel shown in FIG. 2, before executing Step S420, the display panel repair method further includes: acquiring the position information of the broken data line, and configuring the data signal input to the repair line by the data driver on the basis of the mapping relationship between the position information and the gray-scale data. That is, the data signal output to the second output channel 1102 by the data driver is configured.

As an example, the first output channel 1101 is connected to six pixel electrodes 102, i.e., six sub-pixels, via the data line 104, and the timing controller 111 is configured with gray-scale data 240, 240, 255, 255, 255, 255 corresponding to the first output channel 1101. The timing controller 111 sequentially outputs gray-scale data 240, 240, 255, 255, 255, 255 at different times, and the switching transistors 105 of the six sub-pixels are sequentially turned on at different times. At a first time, the switching transistor of the first sub-pixel is turned on, the timing controller 111 outputs the gray-scale data 240, and the data driver 110 converts the gray-scale data 240 into an analog data signal and outputs it to the pixel electrode of the first sub-pixel through the first output channel 1101. At a second time, the switching transistor of the second sub-pixel is turned on, the timing controller 111 outputs the gray-scale data 240, and the data driver 110 converts the gray-scale data 240 into an analog data signal and outputs it to the pixel electrode of the second sub-pixel through the first output channel 1101. At a third time, the switching transistor of the third sub-pixel is turned on, the timing controller 111 outputs the gray-scale data 255, and the data driver 110 converts the gray-scale data 255 into an analog data signal and outputs it to the pixel electrode of the third sub-pixel through the first output channel 1101, and so on for other gray-scale data. If there is a breakpoint between the fourth sub-pixel and the third sub-pixel in the data line 104, the timing controller 111 obtains the gray-scale data 240, 240, 255, 255, 255, 255 arranged in the first output channel 1101 corresponding to the data line 104 according to the mapping relationship between the position information of the data line 104 and the gray-scale data, and maps the gray-scale data 240, 240, 255, 255, 255, 255 to the second output channel 1102. At a fourth time, the switching transistor of the fourth sub-pixel is turned on, the timing controller 111 outputs the gray-scale data 255, and the data driver 110 converts the gray-scale data 255 into an analog data signal and outputs it to the pixel electrode of the fourth sub-pixel through the second output channel 1102. At a fifth time, the switching transistor of the fifth sub-pixel is turned on, the timing controller 111 outputs the gray-scale data 255, and the data driver 110 converts the gray-scale data 255 into an analog data signal and outputs it to the pixel electrode of the fifth sub-pixel through the second output channel 1102. At a sixth time, the switching transistor of the sixth sub-pixel is turned on, the timing controller 111 outputs the gray-scale data 255, and the data driver 110 converts the gray-scale data 255 into an analog data signal and outputs it to the pixel electrode of the sixth sub-pixel through the second output channel 1102.

The gray scale data is related to the configuration of the display panel 100. In case of a display panel with an 8-bit color depth, the gray scale data may be 0 to 255.

In the embodiment shown in FIG. 2, the display further includes a memory 115, the memory 115 is disposed on the second circuit board 113, and the memory 115 is connected to the timing controller 111. In an example, the data lines 104 are sequentially encoded from left to right. Following step S410 and prior to step S420, the codes (position information) corresponding to the broken data lines are written into the memory. The timing controller maps the gray-scale data corresponding to the broken data lines onto the repair line by calling the code information in the memory, thereby applying the corresponding data signal to the second sub-data line.

The display panel 100 of the present application directly utilizes the redundant output channel of the data driver 110. When repairing the broken data line, only the repair line 106a/106b needs to be connected to the second sub-data line 1042, and there is no need to connect the repair line 106a/106b to the first output channel 1101 originally corresponding to the broken data line, thus reducing the repair difficulty and improving the repair efficiency.

Figure 6:
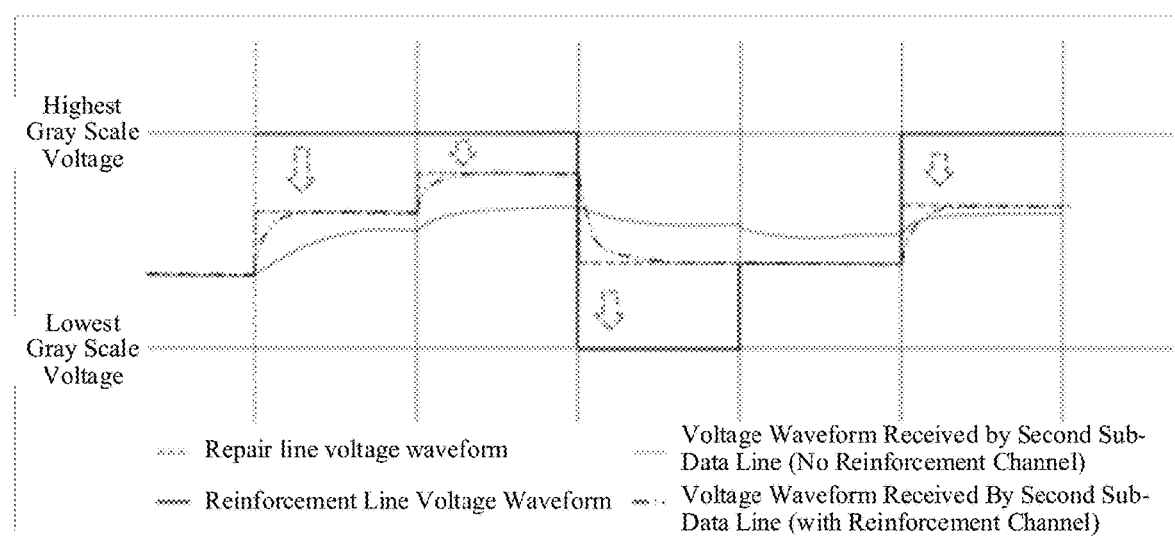
FIG. 6 schematically shows an operating waveform diagram of an embodiment of the present application.

FIG. 6 schematically shows an operating waveform diagram of an embodiment of the present application.

As shown in FIG. 6, when the compensation line 107a/107b and the resistor 108 are not provided (i.e., there is no reinforcement channel), since the transmission path of the data signal is the first sub-repair line 1061→the second sub-repair line 1062→the second sub-data line 1042, which is relatively long, resulting in an increase in resistance and capacitance, the peak value of the actual voltage received by the second sub-data line 1042 is not up to the voltage output by the data driver 110 to the repair line 106a/106b, resulting in a low charging rate of the sub-pixel corresponding to the second sub-data line 1042. With the solution of the present application, i.e., the compensation line 107a/107b and the resistor 108 are provided (i.e., there is a reinforcement channel), when the magnitude of the previous row data signal output by the data driver 110 to the repair line 106a/106b is greater than the magnitude of the current row data signal, the data signal output by the data driver 110 to the compensation line 107a/107b connected to the repair line 106a/106b is the data signal corresponding to the lowest gray scale, at which time, the voltage of the repair line is higher than the voltage of the compensation line, and the repair line voltage leaks to the compensation line 107a/107b through the resistor 108, so as to accelerate the voltage drop speed of the repair line, to make the voltage of the repair line reach the target value. When the magnitude of the previous row data signal output by the data driver 110 to the repair line 106*a*/106*b* is less than that of the current row data signal, the data signal output by the data driver 110 to the compensation line 107*a*/107*b* connected to the repair line 106*a*/106*b* is the data signal corresponding to the highest gray scale, the voltage of the repair line is lower than that of the compensation line, and the voltage of the compensation line leaks to the repair line 106*a*/106*b* through the resistor 108, thus accelerating the voltage rise speed of the repair line and making the voltage of the repair line reach the target value. Finally, the peak value of the actual voltage received by the second sub-data line 1042 is up to the voltage output by the data driver 110 to the repair line 106*a*/106*b*, so that the charging rate of the sub-pixels corresponding to the second sub-data line 1042 is improved, and the screen display effect of the repaired display panel is better.

Other embodiments of the present application will be apparent to those skilled in the art upon consideration of the description and practice of the present application disclosed herein. The present application is intended to encompass any variation, use, or adaptation of the present application that follows the general principles of the present application and includes commonly known or customary technical means in the art that are not disclosed herein. The description and embodiments are considered exemplary only, and the true scope and spirit of the present application are indicated by the following claims.

What is claimed is:

1. A display panel, comprising:
   a substrate;
   a plurality of data lines arranged on the substrate and extending in a column direction, for transmitting data signals;
   at least one repair line arranged on the substrate and overlapped with at least part of the plurality of data lines, for connecting with a broken data line when the broken data line with a breakpoint exists in the plurality of data lines, to repair the broken data line;
   at least one compensation line arranged on the substrate, and each compensation line being connected to the at least one repair line through a resistor; and
   a data driver comprising a plurality of first output channels connected to the plurality of data lines, at least one second output channel connected to an end of the at least one repair line away from the resistor and at least one third output channel connected to an end of the at least one compensation line away from the resistor, the data driver being configured to input data signals to the plurality of data lines, the at least one repair line and the at least one compensation line;
   wherein when a magnitude of the data signal input to the at least one compensation line by the data driver is less than the data signal input to the at least one repair line by the data driver, the at least one repair line leaks electricity to the at least one compensation line through the resistor to accelerate a voltage drop speed of the at least one repair line; when a magnitude of the data signal input to the at least one compensation line by the data driver is greater than a magnitude of the data signal input to the at least one repair line by the data driver, the at least one compensation line leaks electricity to the at least one repair line through the resistor.

2. The display panel according to claim 1, wherein the at least one repair line comprises a first sub-repair line extending in the column direction and a second sub-repair line extending in a row direction, one end of the first sub-repair line being connected to the at least one second output channel, the second sub-repair line being connected to the first sub-repair line and overlapped with at least part of the plurality of data lines, and the at least one compensation line being connected by the resistor to an end of the first sub-repair line away from the at least one second output channel.

3. The display panel according to claim 2, wherein the display panel comprises at least one repair line group, wherein each repair line group comprises two repair lines, the second sub-repair line of a first repair line in the at least one repair line group is connected to the first sub-repair line of a second repair line in the at least one repair line group, and the second sub-repair line of the second repair line in the at least one repair line group is connected to the first sub-repair line of the first repair line in the at least one repair line group.

4. The display panel according to claim 3, wherein the display panel comprises a plurality of data drivers, wherein each of the plurality of data drivers corresponds to one display area, wherein the at least one repair line group is disposed in the one display area, and two first sub-repair lines in the at least one repair line group are provided on two of opposing sides of the one display area, respectively.

5. The display panel according to claim 2, wherein the display panel comprises at least one repair line group, each repair line group comprises two repair lines, the second sub-repair line of a first repair line in the at least one repair line group is disposed at an intermediate position of the first sub-repair line of the first repair line, and the second sub-repair line of a second repair line in the at least one repair line group is disposed at a side of the second sub-repair line of the second repair line away from the at least one second output channel.

6. The display panel according to claim 1, wherein the broken data line is divided by the breakpoint into a first sub-data line connected to the data driver and a second sub-data line disconnected from the data driver, wherein the second sub-data line is repaired to be connected to the at least one repair line by laser.

7. The display panel according to claim 1, wherein the at least one repair line is disposed on one of the plurality of data lines, and melting point of the at least one repair line is lower than that of the one of the plurality of data lines.

8. A display panel repair method for repairing a broken data line of a display panel, wherein the display panel comprises:
   a substrate;
   a plurality of data lines arranged on the substrate and extending in a column direction, for transmitting data signals;
   at least one repair line arranged on the substrate and overlapped with at least part of the plurality of data lines, for connecting with a broken data line when the broken data line with a breakpoint exists in the plurality of data lines, to repair the broken data line;
   at least one compensation line arranged on the substrate, and each compensation line being connected to the at least one repair line through a resistor; and
   a data driver comprising a plurality of first output channels connected to the plurality of data lines, at least one second output channel connected to an end of the at least one repair line away from the resistor and at least one third output channel connected to an end of the at least one compensation line away from the resistor, the data driver being configured to input data signals to the plurality of data lines, the at least one repair line and the at least one compensation line;

wherein when a magnitude of the data signal input to the at least one compensation line by the data driver is less than the data signal input to the at least one repair line by the data driver, the at least one repair line leaks electricity to the at least one compensation line through the resistor to accelerate a voltage drop speed of the at least one repair line: when a magnitude of the data signal input to the at least one compensation line by the data driver is greater than a magnitude of the data signal input to the at least one repair line by the data driver, the at least one compensation line leaks electricity to the at least one repair line through the resistor;

wherein one or more of the plurality of data lines is the broken data line, the broken data line being divided by the breakpoint into a first sub-data line connected to the data driver and a second sub-data line disconnected from the data driver, wherein the display panel repair method comprises:

connecting the second sub-data line to the at least one repair line;

configuring the magnitude of the data signal output by the data driver to the at least one compensation line connected to the at least one repair line to be less than a magnitude of a current row data signal, when a magnitude of a previous row data signal input to the at least one repair line by the data driver is greater than a magnitude of the current row data signal; and configuring the magnitude of the data signal output by the data driver to the at least one compensation line connected to the at least one repair line to be greater than the magnitude of the current row data signal, when the magnitude of the previous row data signal input to the at least one repair line by the data driver is less than the magnitude of the current row data signal.

9. The display panel repair method according to claim 8, wherein configuring the magnitude of the data signal input by the data driver to the at least one compensation line connected to the at least one repair line to be less than the magnitude of the current row data signal comprises:

configuring the data signal output by the data driver to the at least one compensation line connected to the at least one repair line to be voltage data corresponding to a lowest gray scale which the display panel is capable of displaying; and wherein configuring the magnitude of the data signal input by the data driver to the at least one compensation line connected to the at least one repair line to be greater than the magnitude of the current row data signal comprises:

configuring the data signal output by the data driver to the at least one compensation line connected to the at least one repair line to be voltage data corresponding to a highest gray scale which the display panel is capable of displaying.

10. The display panel repair method according to claim 8, wherein after connecting the second sub-data line to the at least one repair line, the method further comprises:

configuring the data signal output by the data driver to the at least one compensation line connected to the at least one repair line to be the current row data signal, when the magnitude of the previous row data signal input by the data driver to the at least one repair line is equal to the magnitude of the current row data signal.

11. The display panel repair method according to claim 8, wherein the method further comprises:

acquiring position information of the broken data line, and configuring the data signal input to the at least one repair line by the data driver on a basis of a mapping relationship between the position information and gray-scale data.

12. A display, comprising:

a display panel; and a backlight module arranged opposite to the display panel and configured to provide backlight for the display panel;

wherein the display panel comprises:

a substrate;

a plurality of data lines arranged on the substrate and extending in a column direction, for transmitting data signals;

at least one repair line arranged on the substrate and overlapped with at least part of the plurality of data lines, for connecting with a broken data line when the broken data line with a breakpoint exists in the plurality of data lines, to repair the broken data line;

at least one compensation line arranged on the substrate, and each compensation line being connected to the at least one repair line through a resistor; and a data driver comprising a plurality of first output channels connected to the plurality of data lines, at least one second output channel connected to an end of the at least one repair line away from the resistor and at least one third output channel connected to an end of the at least one compensation line away from the resistor, the data driver being configured to input data signals to the plurality of data lines, the at least one repair line and the at least one compensation line;

wherein when a magnitude of the data signal input to the at least one compensation line by the data driver is less than the data signal input to the at least one repair line by the data driver, the at least one repair line leaks electricity to the at least one compensation line through the resistor to accelerate a voltage drop speed of the at least one repair line: when a magnitude of the data signal input to the at least one compensation line by the data driver is greater than a magnitude of the data signal input to the at least one repair line by the data driver, the at least one compensation line leaks electricity to the at least one repair line through the resistor.

13. The display according to claim 12, wherein the at least one repair line comprises a first sub-repair line extending in the column direction and a second sub-repair line extending in a row direction, one end of the first sub-repair line being connected to the at least one second output channel, the second sub-repair line being connected to the first sub-repair line and overlapped with at least part of the plurality of data lines, and the at least one compensation line being connected by the resistor to an end of the first sub-repair line away from the at least one second output channel.

14. The display according to claim 13, wherein the display panel comprises at least one repair line group, wherein each repair line group comprises two repair lines, the second sub-repair line of a first repair line in the at least one repair line group is connected to the first sub-repair line of a second repair line in the at least one repair line group, and the second sub-repair line of the second repair line in the at least one repair line group is connected to the first sub-repair line of the first repair line in the at least one repair line group.

15. The display according to claim 14, wherein the display panel comprises a plurality of data drivers, wherein each of the plurality of data drivers corresponds to one display area, wherein the at least one repair line group is disposed in the one display area, and two first sub-repair lines in the at least one repair line group are provided on two of opposing sides of the one display area, respectively.

16. The display according to claim 13, wherein the display panel comprises at least one repair line group, each repair line group comprises two repair lines, the second sub-repair line of a first repair line in the at least one repair line group is disposed at an intermediate position of the first sub-repair line of the first repair line, and the second sub-repair line of a second repair line in the at least one repair line group is disposed at a side of the second sub-repair line of the second repair line away from the at least one second output channel.

17. The display according to claim 12, wherein the broken data line is divided by a breakpoint into a first sub-data line connected to the data driver and a second sub-data line disconnected from the data driver, wherein the second sub-data line is repaired to be connected to the at least one repair line by laser.

18. The display according to claim 12, wherein the at least one repair line is disposed on one of the plurality of data lines, and melting point of the at least one repair line is lower than that of the one of the plurality of data lines.

* * * * *